United States Patent
Li

(10) Patent No.: US 7,589,138 B2
(45) Date of Patent: Sep. 15, 2009

(54) INJECTION MOLDING PROCESS

(75) Inventor: Frank Li, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 178 days.

(21) Appl. No.: 11/633,932

(22) Filed: Dec. 5, 2006

(65) Prior Publication Data

US 2008/0128950 A1    Jun. 5, 2008

(51) Int. Cl.
C08K 5/526 (2006.01)
C08K 5/098 (2006.01)
C08J 5/00 (2006.01)

(52) U.S. Cl. .................. 524/140; 524/141; 524/145; 524/396; 524/570; 264/328.14; 264/331.17

(58) Field of Classification Search .............. 524/145, 524/396, 140, 141, 570; 264/331.17, 328.14
See application file for complete search history.

(56) References Cited

U.S. PATENT DOCUMENTS

| | | | |
|---|---|---|---|
| 5,114,789 A | 5/1992 | Reafler | |
| 5,158,920 A | 10/1992 | Razavi | |
| 5,416,228 A | 5/1995 | Ewen et al. | |
| 5,789,502 A | 8/1998 | Shamshoum et al. | |
| 5,807,800 A | 9/1998 | Shamshoum et al. | |
| 5,968,864 A | 10/1999 | Shamshoum et al. | |
| 5,972,520 A | 10/1999 | Howell | |
| 6,153,715 A | 11/2000 | Nakamura | |
| 6,177,515 B1 | 1/2001 | Smith et al. | |
| 6,225,251 B1 | 5/2001 | Shamshoum et al. | |
| 6,262,199 B1 | 7/2001 | Ewen et al. | |
| 6,313,242 B1 | 11/2001 | Reddy | |
| 6,432,860 B1 | 8/2002 | Shamshoum et al. | |
| 6,518,377 B1 | 2/2003 | Shamshoum et al. | |
| 6,561,122 B1 | 5/2003 | Kurja et al. | |
| 6,565,970 B2 | 5/2003 | Gownder et al. | |
| 6,656,404 B2 | 12/2003 | Morin et al. | |
| 6,733,719 B2 | 5/2004 | DiNardo et al. | |
| 6,734,270 B1 | 5/2004 | Minami | |
| 6,759,124 B2 | 7/2004 | Royer et al. | |

(Continued)

OTHER PUBLICATIONS

"Homopolymer—Clarified Metallocene Sheet Extrusion and Thermoforming Grade," Polypropylene M3282MZ, Total Petrochemicals, Inc., 1 pg.

(Continued)

*Primary Examiner*—Fred M Teskin
(74) *Attorney, Agent, or Firm*—Diane L. Kilpatrick-Lee

(57) ABSTRACT

A process for the preparation of a molded article formed of an isotactic ethylene propylene copolymer comprising providing an isotactic ethylene-propylene copolymer having an ethylene content of no more than 5 weight percent produced by the copolymerization of ethylene and propylene in the presence of an isospecific metallocene catalyst; heating the copolymer to a molten state; incorporating a nucleating agent into copolymer in an amount effective to provide a uniform shrinkage of the molded article at 48 hours molding of the at least 85% as determined by the differential in transverse and longitudinal shrinkage at the 48 hour mark; extruding the molten copolymer into a mold cavity; cooling the copolymer within the confines of the mold cavity to solidify the copolymer and form the molded article which is then retrieved from the mold cavity.

13 Claims, 3 Drawing Sheets

U.S. PATENT DOCUMENTS

| | | | |
|---|---|---|---|
| 6,949,208 | B1 | 9/2005 | Kawauchi et al. |
| 7,037,103 | B2 | 5/2006 | Niewels |
| 2005/0070673 | A1 | 3/2005 | Novak et al. |
| 2006/0079613 | A1* | 4/2006 | Hanssen .................... 524/115 |
| 2006/0128842 | A1 | 6/2006 | Burmaster et al. |
| 2006/0173132 | A1 | 8/2006 | Mehta et al. |
| 2007/0040292 | A1* | 2/2007 | Ashbaugh et al. .......... 264/40.1 |

OTHER PUBLICATIONS

"Hyperform® HPN-68L," Milliken Chemical—Hyperform® Nucleating Agents, http://www.millikenchemical.com/Chemical/chemdivp.nsf/KLWebKey/Hyperform, Apr. 11, 2005, 2 pgs.

Sherman, Lilli Manolis, "New Clarifiers & Nucleators: They Make Polypropylene Run Clearer and Faster," Plastics Technology—Feature Article, http://www.plasticstechnology.com/articles/article_print1.cfm, Apr. 13, 2005, 5 pgs.

* cited by examiner

INJECTION MOLDING PROCESS

FIELD OF THE INVENTION

This invention relates to the preparation of molded articles formed of an isotactic ethylene propylene copolymer and more particularly to the preparation of such articles exhibiting enhanced stability in post molding changes.

BACKGROUND OF THE INVENTION

Isotactic propylene polymers including propylene homopolymers and ethylene propylene copolymers can be produced by the polymerization of the olefin monomer units in the presence of catalysts such as Ziegler Natta catalysts or isospecific metallocene catalysts. Isotactic propylene polymers can be used in the production of molded articles in which the polypropylene is heated and then extruded through one or more dies or nozzles into a mold cavity in which it moves in both a longitudinal direction (referred to as the flow direction) and in a transverse or lateral direction (sometimes referred to as the cross flow direction). The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

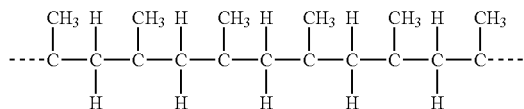

Stereoregular polymers, such as isotactic and syndiotactic polypropylene, can be characterized in terms of the Fisher projection formula. Using the Fisher projection formula, the stereochemical sequence of isotactic polypropylene as shown by Formula (1) is described as follows:

Another way of describing the structure is through the use of NMR. Bovey's NMR nomenclature for an isotactic pentad is . . . mmmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer. In the case of random ethylene propylene copolymers, a relatively low ethylene content in the copolymer is randomly distributed throughout the polymer chain so that ethylene units are randomly interposed between the repeating propylene units.

In injection molding operations employing propylene homopolymers or copolymers, the molten polymer is introduced into a mold cavity. The molten polymer is retained in the cavity for a sufficient time to allow the desired component to form. The period of time required for the repeated cooling and subsequent removal of the molded component from the mold cavity is an important factor in the manufacturing efficiency of the injection molding operation.

During the manufacturing of a molded plastic component shrinkage within the mold and subsequent to withdrawal of the hard component from the mold results in a volume difference between the initially cast mold and the final molded article. If the dimensional changes are relatively uniform in the transverse (cross flow) and longitudinal (flow) directions of the mold, the shrinkage characteristic is considered to be isotropic. With significant differential dimensional changes in the transverse and longitudinal directions, the dimensional changes are characterized as anisotropic or differential. Warpage is caused by variations in shrinkage throughout injection molded part (D Rosata, Injection Molding Handbook, Chapman & Hall, New York, 1995). More anisotropic shrinkage often leads to warpage problems in injection molding applications. Regardless of whether the shrinkage characterized is isotropic or anisotropic, the relative shrinkage should be taken into account in order to obtain the end use articles of the molded article of the correct dimension.

SUMMARY OF THE INVENTION

In accordance with the present invention, there is provided a process for the preparation of a molded article formed of an isotatic ethylene propylene copolymer which results in post molding shrinkage which is relatively isotropic in nature. In carrying out the invention, there is provided an isotactic ethylene-propylene copolymer having ethylene content of no more than 5 weight percent as produced by the copolymerization of ethylene and propylene in the presence of an isospecific metallocene catalyst. The ethylene propylene copolymer is heated to a molten state and the molten copolymer is extruded into a mold cavity to form a molded article conforming to the configuration of the mold cavity. The copolymer is cooled within the confines of the mold cavity to a temperature sufficient to solidify the copolymer and form a molded article. The molded article is then retrieved from the mold cavity. Prior to extruding the copolymer into the mold cavity, a nucleating agent is incorporated into the copolymer. The nucleating agent is employed in an amount effective to provide a uniform shrinkage of the molded article at 48 hours after molding of at least 85% is determined by the differential in transverse and longitudinal shrinkage at the 48 hour mark.

In one embodiment of the invention, the copolymer has an ethylene content of no more 3 weight percent, and typically about 2 weight percent. The nucleating agent may be selected from a group consisting of an organophosphate salt and a norbornane carboxylic-acid salt. A specific organophosphate is a sodium organophosphate, more specifically sodium 2,2 methylene-bis (4,6 di-tert butyl phenyl) phosphate. In another embodiment of the invention the norbornane carboxylic acid salt, is cis-endo-bicyclo(2,2,1)heptane-2,3-dicarboxylic acid sodium salt.

In another aspect of the invention, the ethylene propylene copolymer article formed during the cooling procedure exhibits shrinkage which is more isotropic than the shrinkage of a corresponding ethylene-propylene copolymer molded under the same conditions but without the incorporation of a nucleating agent. In yet another aspect of the invention, during the cooling of the ethylene-propylene copolymer within the mold, the rate of polymer crystallization proceeds at a rate greater than the rate of polymer crystallization for a corresponding ethylene propylene copolymer without the presence of the nucleating agent.

DETAILED DESCRIPTION OF THE INVENTION

Figure 1:
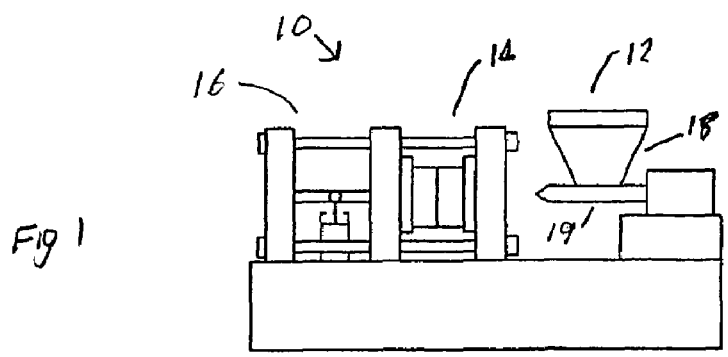
FIG. 1 is a schematic representation of an exemplary injection molding machine which may be used in carrying out the injection.

The present invention can be carried out any suitable injection molding system. FIG. 1 illustrates a suitable injection molding system 10 which comprises plasticizing injection unit 12, a mold section 14 having a mold cavity of the desired configuration and a clamping section 16. More particularly and as illustrated in FIG. 1, the plasticizing injection unit 12 comprises a hopper 18 through which polymer pellets are supplied to a screw plasticizing unit 19. The plasticizing unit 19 is shown in more detail in FIG. 2 and comprises an outer cylinder 20 within which a screw 22 rotates and takes in the pelletized polymer material 23 from the hopper 18. The screw is rotated under a cylinder drive section 24 and transports melt to the screw chamber 26 in front of the screw tip. As the screw rotates, it returns by the pressure generated in the screw tip, sliding axially. The plasticizing unit is supplied with a plurality of external heating bands 28 which provide heat for the melting of the polymer material. In addition to heat supplied by the heating bands, the rotation of the screw causes the polymeric material to advance toward the nozzle which shears the polymeric material and produces a friction heat which further aids in melting the polymer material. After the plasticizing step is completed, the screw stops rotating, and functions as a piston under the application of hydraulic pressure in the hydraulic cylinder 24. This advancing screw forces the melted plastic from the screw chamber through the nozzle section 25 into the mold section 14. Clamping unit 16 functions to close the mold section 14 so that it remains closed against the injection pressure during the injection sequence and to thereafter open the mold for removal of the injection molded article from the mold. System 10 is further provided with a suitable control system and a tempering system (not shown) which functions to cool the injected molten mass within the mold so that it can be solidified and subsequently removed.

Figure 2:
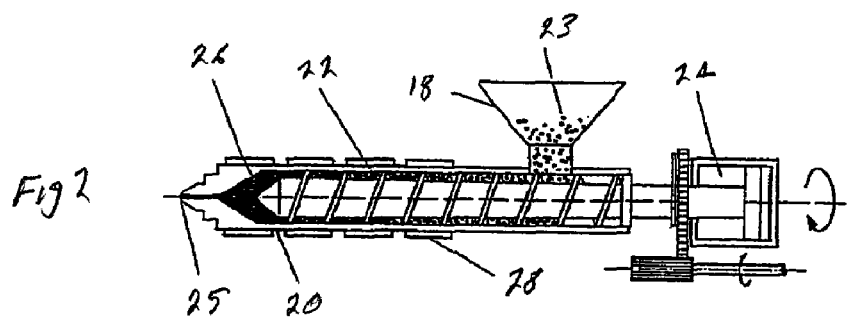
FIG. 2 is a side elevation with parts broken away of a schematic illustration of one component of the injection molding machine.

A typical operating protocol for an injection mold system of the type illustrated in FIGS. 1 and 2 involves a plasticizing stage in which the internal screw 22 rotates and transports the molten polymer to the screw chamber 20 immediately before the nozzle 25. The screw is then slid axially back and at the end of the plasticization stage, rotation of the screw is terminated. The clamping unit then functions to close the mold halves and at the start of the injection stage the screw moves forward axially without rotation to inject the melt from the screw chamber through the nozzle section into the cavity of the mold section 14. As the polymer in the mold cavity cools down from the initial melt temperature, additional polymer melt is conveyed into the cavity to compensate for any contraction in volume during cooling. After the molded article has cooled sufficiently, the mold is opened and the finished molded article is withdrawn from the mold and the next sequence in the cycle of operation is initiated. Any suitable injection molding system may be employed in carrying out the present invention. For a detailed description of a suitable injection system, reference is made to U.S. Pat. No. 6,949,208 to Kawauchi et al. and U.S. Pat. No. 7,037,103 to Niewels. The entire disclosures of these patents are incorporated herein by reference.

The isotactic ethylene propylene copolymer employed in carrying out the invention typically will have a melting temperature of about 120-140° C. or slightly above. Prior to extruding the copolymer, it normally will be heated to a temperature above its melting temperature by anT increment of about 60-90° C., typically to a temperature within the range of 180-230° C. in order to provide a molten state suitable for extrusion into the mold cavity. Subsequently, the molten polymer within the mold cavity is cooled to a temperature significantly less than the heat distortion temperature (HDT) of the copolymer, normally less than 80° C., in order to produce the solidified molded article. In most applications it will be suitable to bring the molded article to a value below the HDT but above room temperature, about 20-25° C., after which the mold can be opened and the molded article removed.

The nucleating agent may be incorporated into the copolymer in a suitable amount at any point prior to extruding the copolymer into the mold cavity. The nucleating agent may be added to the polymer pellets as they are supplied to the hopper 18 of the molding system. Alternatively, the nucleating agent may be added to the polymer fluff prior to pelletization of the polymer or it may be incorporated during formation of the master batch of the polymer. The nucleating agent may be added to the polymer in any suitable amount, preferably an amount within the range of 0.005-0.3 weight percent, and more preferable in an amount within the range of 0.025-0.2 weight percent. The nucleating agent typically will be in a particulate form, usually in the form of a finely ground polymer.

In experimental work carried out with respect to the present invention, formulations were formed from a metallocene catalyzed random ethylene propylene copolymer having an ethylene content of about 2 weight percent. The random copolymer was prepared by the polymerization of propylene and ethylene in the presence of a racemic bisindenyl type metallocene catalyst system employing a metallocene ligand structure formed of a bridged bis(2-methyl, 4-phenyl indenyl) ligand structure. The specific catalyst system employed in producing the ethylene propylene copolymer used in the experimental work comprised dimethyl silyl bis, 2-methyl, 4 phenyl indenyl) zirconium dichloride and at least one cocatalyst system comprising methyl alumoxane.

The polymer used in the experimental work was a metallocene catalyzed ethylene propylene copolymer having a melt temperature of about 136° C. and a melt flow rate MFR of 30 grams per 10 minutes. The melt flow rate MFR was determined in accordance with ASTM D1238 condition L which specifies a temperature of 230° C. and a load of 2.16 kg with the result reported in terms of grams per 10 minutes. The polymer was produced by the copolymerization of propylene with ethylene employing the previously identified racemic dimethylsilyl bis (2 methyl, 4 phenyl indenyl) zirconium dichloride. The cocatalyst employed methylalumoxene in an amount to provide an aluminum zirconium ratio of about 50:200 wt:wt Al:Zr.

The metallocene random copolymer, abbreviated herein "mRCP", was employed in seven polymer systems identified herein as polymers A-G.

Polymer A was polymer mRCP without the addition of a nucleating agent or corresponding additive.

Polymer B was the aforementioned mRCP containing talc (magnesium silicate hydrate) in an amount of 2000 ppm.

Polymer C contained sodium benzoate in an amount of 800 ppm.

Polymer D contained an organophosphate salt in an amount of 1000 ppm. The specific organophosphate salt employed here was a lithium based salt, lithium, 2,2 methylene-bis (4,6 di-tert butyl phenyl) phosphate employed in an amount of 1000 ppm.

Polymer E also contained an organophosphate salt. In this case, the salt was sodium 2,2 methylene-bis (4,6 di-tert butyl phenyl) phosphate in an amount of 1000 ppm.

Polymer F was formulated with the previously identified mRCP containing 1900 ppm of dibenzylidene sorbitol.

Polymer G was a norbornane carboxylic acid salt, and cis-endo-bicyclo(2,2,1)heptane-2,3-dicarboxylic acid. The additive here was present in the amount of 800 ppm.

The aforementioned additives employed in the polymer systems of B-G are commercially available products which can be used in polypropylene crystallizations. The additives are set forth in Table 1 where they are identified in terms of their common commercial names or trademarks, their chemical designations and their general categories.

| Com. name | Chemical | Category |
|---|---|---|
| 1 Talc | Magnesium silicate hydrate | Inorganic filler |
| 2 Sodium benzoate | Benzoic acid sodium salt | Aromatic carboxylic acid salt. |
| 3 NA-11 (a) | Sodium 2,2-methylene-bis-(4,6-di-tert-butylphenyl) phosphate | Organophosphate salt, |
| 4 HPN-68L (b) | cis-endo-bicyclo(2,2,1)heptane-2,3-dicarboxylic acid, - i.e. dicarboxylic sodium salt. | Norbornane carboxylic-acid salt. |
| 5 NA-21 (a) | Lithium 2,2-methylene-bis-(4,6-di-tert-butylphenyl phosphate) | Organophosphate salt |
| 6 Millad 3988 (b) | Dibenzylidene sorbitol | dibenzylidene sorbitol (DBS) |

(a) Amfine Chemical Corp.
(b) Milliken Chemical Co.

Figure 3:
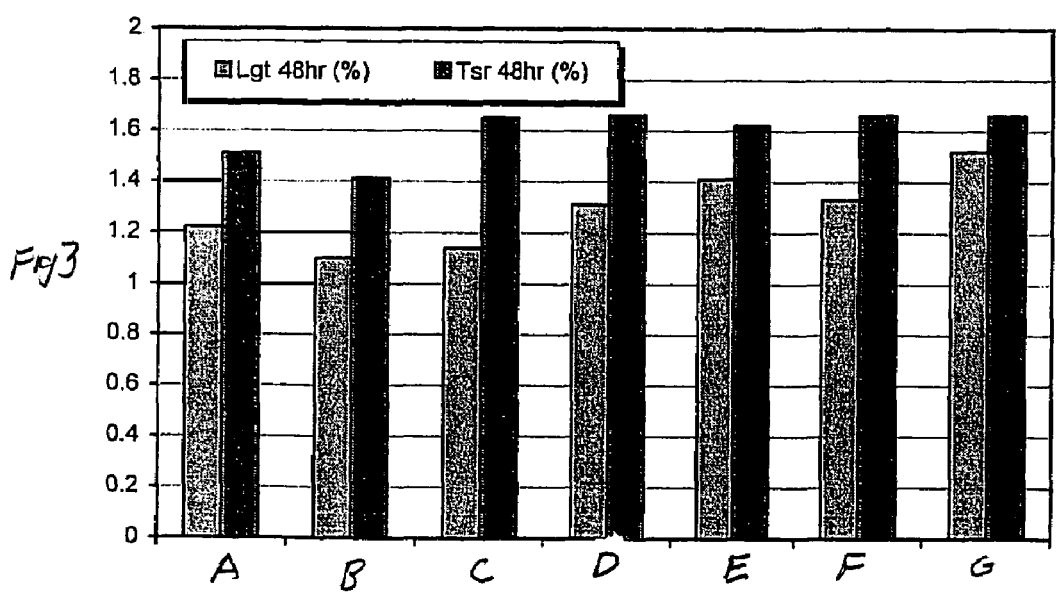
FIG. 3 is a bar graph illustrating longitudinal and transverse shrinkage values for a random ethylene propylene copolymer incorporating various additive systems.
Figure 4:
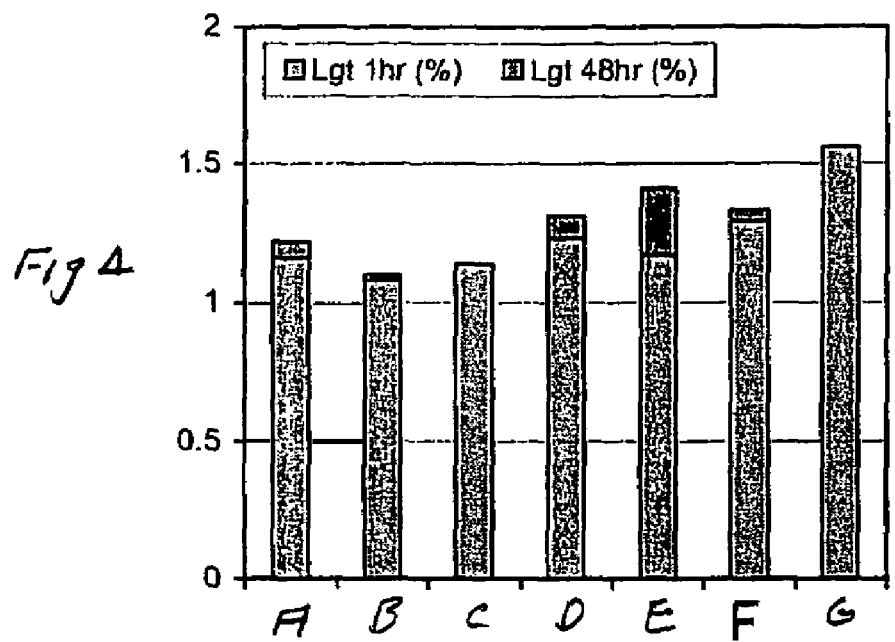
FIG. 4 is a bar graph illustrating longitudinal shrinkages at time periods at one hour and 48 hours after molding for the polymer systems illustrated in FIG. 3.
Figure 5:
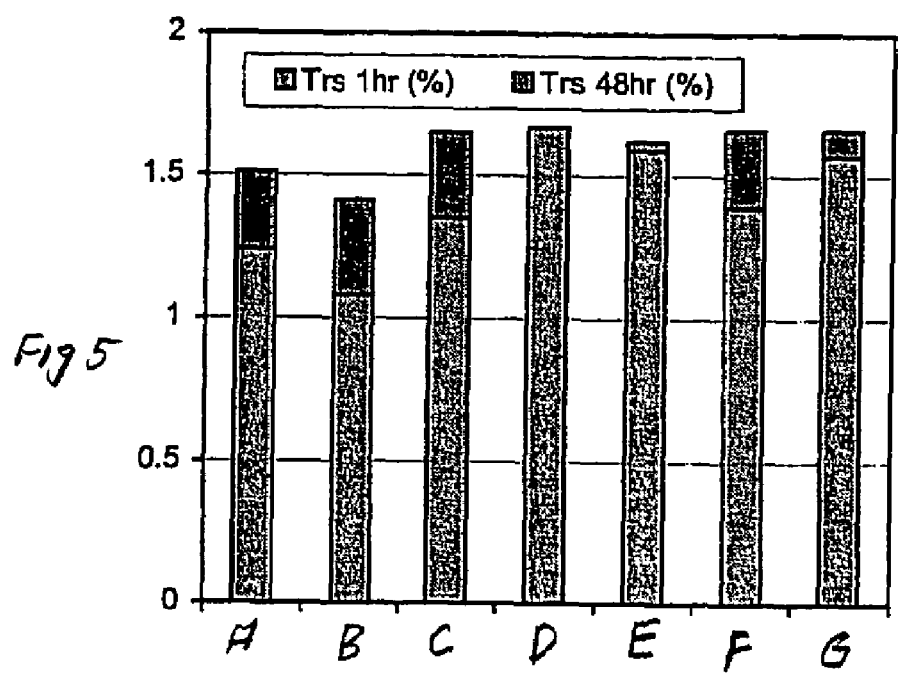
FIG. 5 is a bar graph illustrating transverse shrinkages for molded components formed at one hour and 48 hours for the polymer systems of FIG. 3.

The aforementioned polymer systems were injection molded to form plaques having dimensions of 60 mm in each of the flow and cross flow directions and 2 mm in thickness (ISO 294). These plaques were then characterized in terms of shrinkages in both the transverse (cross flow) and longitudinal (flow) directions at times of one hour after they were removed from the mold and 48 hours after they were removed from the mold. The shrinkage results for polymer systems A-G are shown in FIGS. 3-5 which are bar graphs of percent shrinkage plotted on the ordinate for each of the polymer systems identified herein as Polymers A-G. In FIG. 3, the shrinkage characteristic shown is the percent shrinkage at 48 hours with the light colored bars indicating longitudinal direction shrinkage and the dark bars indicating transverse direction shrinkage.

In FIG. 4 the shrinkage characteristic plotted is shrinkage in the longitudinal direction at one hour and 48 hours after molding with the shrinkage at one hour shown by the light colored bars and the shrinkage at 48 hours shown by the dark colored bars. Similar results are shown in FIG. 5 for shrinkage in the transverse or cross flow direction with the shrinkage at one hour indicated by the light colored bars and the shrinkage at the 48 hours by the dark colored bars.

The important characteristic of uniformity in shrinkage at 48 hours which indicates the resistance to tendency of warpage of the molded article can be seen from an examination of the data in FIG. 3. Two polymer systems, polymer E incorporating nucleating additive 3, the sodium organophosphate salt, and polymer system G incorporating additive 4, the norbornane carboxylic acid salt, satisfy the criterion of a differential and transverse and longitudinal shrinkages at 48 hours after molding of at least 85%. Specifically polymer E showed a uniform shrinkage factor of about 87%, and polymer G showed a uniform shrinkage factor of close to 90%. The remaining polymer systems all showed uniform shrinkage factors of less than 85%.

Figure 6:
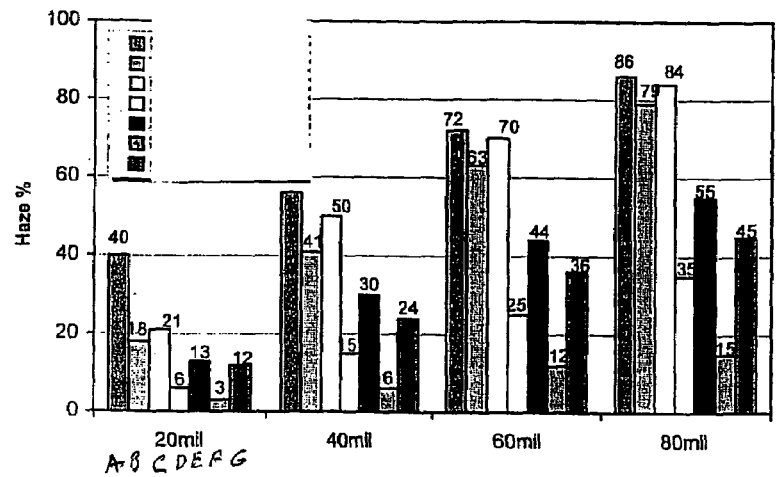
FIG. 6 is a bar graph illustrating haze characteristics for the polymer systems illustrated in FIG. 3.

In further experimental results, the various nucleators identified above were evaluated in terms of their impact upon optical properties. In this respect the polymer systems A-F were molded into plaques ranging in thickness from 20 to 80 mils and then evaluated in terms of haze. Haze measurements were performed in accordance with ASTM D1003 at ambient temperature. The results are in terms of percent haze plotted on the ordinate for plaques having thicknesses of 20, 40, 60 and 80 mils. As can be seen from an examination of FIG. 6, the polymers D and F exhibited very good haze characteristics. Polymers E and G also retain relatively good haze. Thus, the desired reduction in warpage characteristics achieved by the use of preferred nucleators, sodium norbornane carboxylic acid and sodium organophosphate salt was achieved while retaining relatively good haze characteristics. In fact, in each case, the plaque incorporating the preferred nucleating agent exhibited lower haze than the polymer which was free of nucleating agent.

In further experimental work, a random ethylene propylene copolymer was produced by polymerization employing a Ziegler Natta catalyst characterized in terms of its isotropic characteristics. The Ziegler Natta catalyst employed in polymerization was a supported Ziegler Natta catalyst system and the isotactic copolymer contained about 2.2 weight percent of ethylene. The Ziegler Natta catalyzed copolymer was tested in five polymer formulations, one which had no nucleator present polymer N0, and in four polymers N1, N2, N3, and N4, each containing a nucleator, nucleators 3 and 4, (which were highly effective in the metallocene polymerized copolymers) and nucleators 1 and 2, talc and sodium benzoate which in the previous experimental work were relatively ineffective in producing the desired uniform shrinkage factor.

Figure 7:
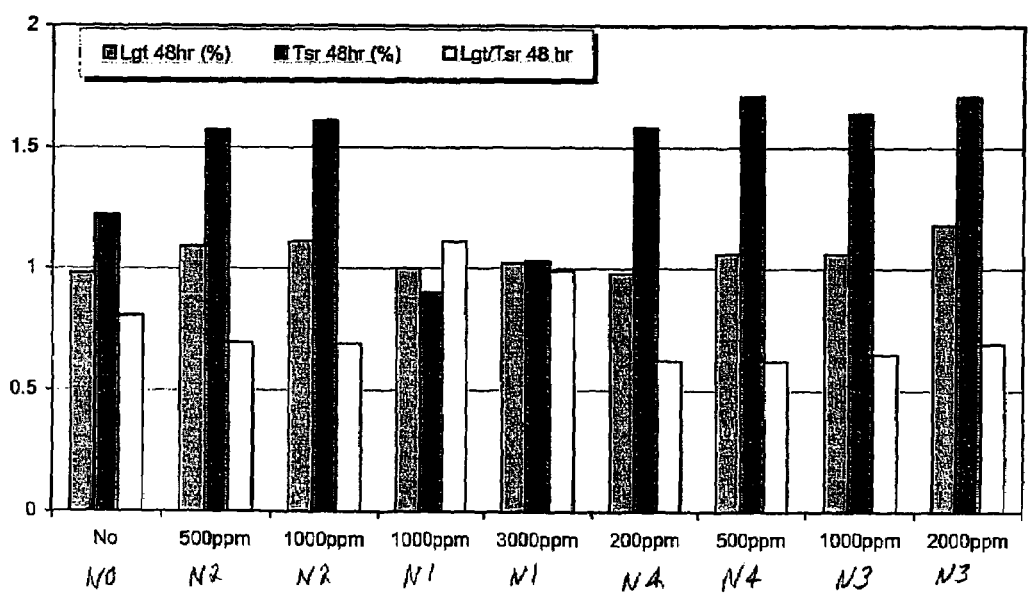
FIG. 7 is a bar graph illustrating longitudinal and transverse shrinkage of the values for an ethylene propylene copolymer produced by polymerization with a Ziegler Natta catalyst system.

In FIG. 7, the longitudinal and transverse shrinkages at 48 hours reached with the aforementioned polymer systems are plotted on the ordinate versus the various nucleators in the system. In addition as a measure of the natural isotropicity of the polymer system, the ratio of shrinkage in the longitudinal direction divided by the shrinkage in the transverse direction is plotted on the ordinate as indicated by the clear bar graphs. The ratio bar graphs approaching unity are indicative of a polymer characteristic providing relatively high uniform shrinkage factors whereas those exhibiting the lower value are progressively more anisotropic. As can be seen from an examination of the data in FIG. 7, the impact of the various nucleators on the uniform shrinkage factor of the various polymer systems is exactly the reverse of those employed with the metallocene catalyzed copolymer. Specifically, nucleators 3 and 4 (in polymers N3 and N4, respectively), which were most effective in establishing high uniform shrinkage factors for the metallocene catalyzed copolymer produced generally the worst shrinkage factors for the Ziegler Natta catalyzed polypropylene. The nucleators 1 (talc) and 2 (sodium benzoate) which were relatively ineffective in the metallocene polymerized copolymer proved to be the most effective here. Both proved to be more effective than nucleators 3 and 4.

Metallocene catalyst which may be employed in polymerization of the ethylene propylene copolymers employed in the present invention include bridged bis indenyl or bis tetrahydroindenyl metallocenes which are known to function to exhibit high isospecificity. These metallocenes which may be substituted or unsubstituted are racemic or at least have a substantially high content of racemic isomers as compared with meso isomers. The bis indenyl (or tetrahydroindenyl) ligands may be substituted or unsubsited, especially suitable racemic bis indenyl structures are those in which the indenyl groups are substituted by a bulky substituent, e.g., phenyl or tertiary butyl, at the 4 position and with less bulky substituents, e.g., methyl or ethyl groups, at the 2 position. Other metallocenes which can be employed in producing isotatic ethylene propylene copolymers include stereo rigid cyclopentadienyl-fluorenyl ligand structures which are substituted on either or both of the cyclopentadienyl and fluorenyl groups in a manner to eliminate the bilateral symmetry which would normally be present in the cyclopentadienyl-fluorenyl ligand structure. Other metallocene catalysts which may be employed in producing the ethylene propylene copolymers used in the process of the present invention include metallocenes incorporating bis fluorenyl ligand structures of a staggered conformation. Here the fluorenyl groups (including octohydro fluorenyl groups) are bridged and the two fluornyl groups are independently substituted on opposed sides of the bridged symmetry line through the ligand structure in order to provide a staggered conformation in which bilateral symmetry is eliminated.

The transition metals employed in forming metallocene catalysts of the type described above are normally from Group 4 or Group 5 of the Periodic Table of Elements (new notation). Especially suitable transition metals are zirconium hafnium and titanium. For a further description of bridged metallocene catalysts which are effective in producing isotatic polymers, reference is made to U.S. Pat. Nos. 6,262,199 and 6,313,242, the entire disclosures of which are incorporated herein by reference.

Having described specific embodiments of the present invention, it will be understood that modifications thereof may be suggested to those skilled in the art and it is intended to cover all such modifications as fall within the scope of the appended claims.

What is claimed is:

1. A method for the preparation of a molded article formed of an isotactic ethylene propylene copolymer comprising:
    (a) providing an isotactic ethylene propylene copolymer having an ethylene content of no more than 5 weight percent produced by the copolymerization of ethylene and propylene in the presence of an isospecific metallocene catalyst;
    (b) heating said ethylene propylene copolymer to a molten state;
    (c) extruding said molten copolymer into a mold cavity to form a molded article conforming to the configuration of said mold cavity;
    (d) cooling said ethylene propylene copolymer within the confines of said mold cavity to a temperature effective to solidify said copolymer within said mold cavity to form a solidified molded article;
    (e) retrieving said solidified molded article from said mold cavity; and
    (f) prior to extruding said copolymer in paragraph (c) incorporating into said copolymer a nucleating agent selected from the group consisting of an oranophosphate salt and a norbornane carboxylic-acid salt in an amount effective to provide a uniform shrinkage of said molded article at 48 hours after molding of at least 85% as determined by the differential in transverse and longitudinal shrinkages at 48 hours after molding.

2. The method of claim 1 wherein said copolymer has an ethylene content of no more than 3 weight percent.

3. The method of claim 1 wherein said nucleating agent is a sodium organophosphate.

4. The method of claim 3 wherein said sodium organophosphate is sodium 2,2-methylene-bis-(4,6-di-tert-butylphenyl) phosphate.

5. The method of claim 1 wherein said nucleating agent is a norbornane carboxylic-acid salt.

6. The method of claim 5 wherein said norbornane carboxylic-acid salt is cis-endo-bicyclo(2,2,1)heptane-2,3-dicarboxylic acid sodium salt.

7. A method for the preparation of a molded article formed of an isotactic ethylene propylene copolymer comprising:
    (a) providing an isotactic ethylene propylene copolymer having an ethylene content of no more than 5 weight percent produced by the copolymerization of ethylene and propylene in the presence of an isospecific metallocene catalyst;
    (b) heating said ethylene propylene copolymer to a molten state;
    (c) extruding said molten copolymer into a mold cavity to form a molded article conforming to the configuration of said mold cavity;
    (d) cooling said ethylene propylene copolymer within the confines of said mold cavity to a temperature effective to be solidify said copolymer within said mold cavity to form a solidified molded article;
    (e) retrieving said solidified molded article from said mold cavity; and
    (f) prior to extruding said copolymer in paragraph (c) incorporating into said copolymer a nucleating agent in an amount within the range of 0.005-0.3 weight percent which is selected from the group consisting of an organophosphate salt and a norbornane carboxylic-acid salt.

8. The method of claim 7 wherein said nucleating agent is a sodium organophosphate.

9. The method of claim 8 wherein said sodium organophosphate is sodium 2,2-methylene-bis-(4,6-di-tert-butylphenyl) phosphate.

10. The method of claim 7 wherein said nucleating agent is a norbornane carboxylic-acid salt.

11. The method of claim 10 wherein said norbornane carboxylic-acid salt is cis-endo-bicyclo (2,2,1)heptane-2,3-dicarboxylic acid sodium salt.

12. The method of claim 7 wherein said copolymer has an ethylene content of no more than 3 weight percent.

13. The method of claim 7 wherein said nucleating agent is effective to provide a uniform shrinkage of said molded article at 48 hours after molding of at least 85% as determined by the differential in transverse and longitudinal shrinkages at 48 hours after molding.

* * * * *